Jan. 17, 1939.  E. MARTIN  2,144,428
AERONAUTICAL PROPELLER HAVING VIBRATION CONTROLLING FEATURES
Filed Jan. 28, 1936  2 Sheets-Sheet 1

INVENTOR.
ERLE MARTIN
BY Harris G. Luther
ATTORNEY

Jan. 17, 1939. E. MARTIN 2,144,428
AERONAUTICAL PROPELLER HAVING VIBRATION CONTROLLING FEATURES
Filed Jan. 28, 1936 2 Sheets-Sheet 2
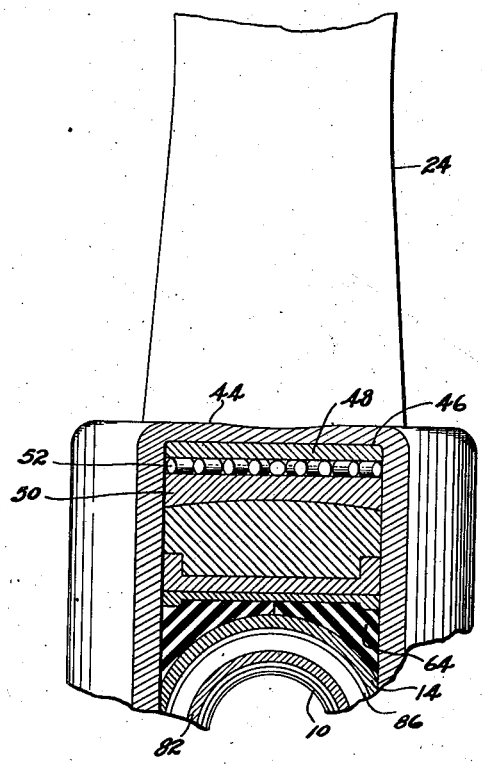
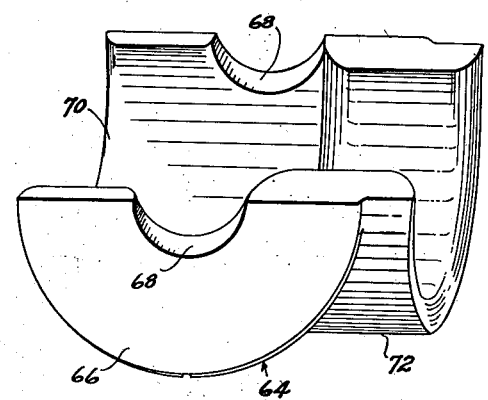
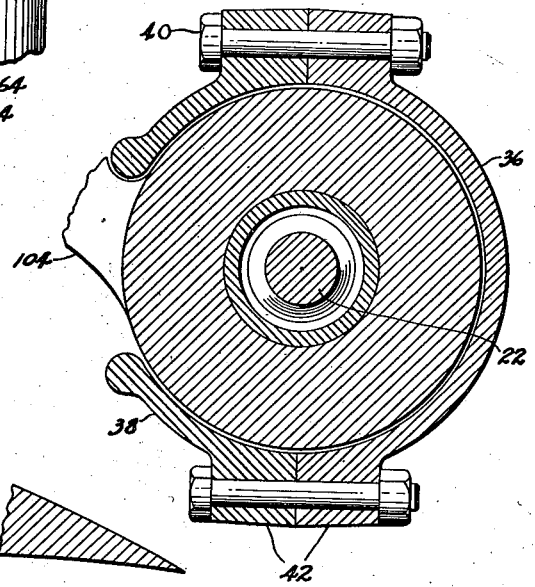
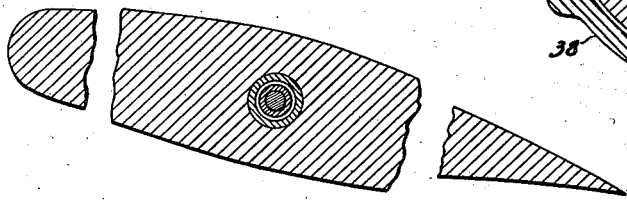
INVENTOR.
ERLE MARTIN
BY Harris G. Luther
ATTORNEY Patented Jan. 17, 1939

2,144,428

UNITED STATES PATENT OFFICE 2,144,428

AERONAUTICAL PROPELLER HAVING VIBRATION CONTROLLING FEATURES

Erle Martin, West Hartford, Conn., assignor to United Aircraft Corporation, East Hartford, Conn., a corporation of Delaware Application January 28, 1936, Serial No. 61,154

21 Claims. (Cl. 170—173)

This invention relates to improvements in aeronautical propellers having vibration controlling features, and has particular application to metal propellers composed of a number of assembled elements such, for instance, as controllable pitch propellers wherein the blades are separate from the hub and are rotatably secured to the hub for pitch changing angular adjustments about their longitudinal axes.

An object of the invention resides in the provision of an aeronautical propeller of the character described, so constructed that the propeller or the propeller and engine crankshaft as a unit will not be in resonance with the vibration frequency of the engine at any normal engine operating speed.

Another object resides in the provision of a propeller of the character described so constructed that the propeller may have a limited freedom of movement with respect to its mounting so that it may bring its center of mass into coincidence with the center of rotation in the event these two centers should not exactly coincide by reason of the propeller being slightly out of balance.

A further object resides in the provision of an improved connection between the propeller blades and the hub so that the blades of the propeller are not subjected to the strains and stresses incident to engine vibrations, whereby the propeller blades may be made lighter, their durability is improved and at the same time the controllable features of the propeller are not interfered with.

Other objects and advantages will be pointed out hereinafter, or will become apparent as the description proceeds.

In the accompanying drawings in which like reference numerals are used to designate similar parts throughout, there is illustrated a suitable mechanical embodiment of what is now considered to be the preferred form of the invention. The drawings, however, are for the purpose of illustration only and are not to be considered as limiting the invention, the scope of which is to be measured entirely by the scope of the appended claims.

In the drawings, Fig. 1 is a longitudinal sectional view of a propeller hub and fragmentary portions of the propeller blades attached thereto.

Fig. 2 is a sectional view on the line 2—2 of Fig. 1, looking in the direction of the arrows.

Fig. 3 is a perspective view of a resilient cushion member incorporated in the propeller hub.

Fig. 4 is a sectional view on the line 4—4 of Fig. 1, looking in the direction of the arrows.

Fig. 5 is a sectional view on the line 5—5 of Fig. 1, looking in the direction of the arrows.

Figure 1:
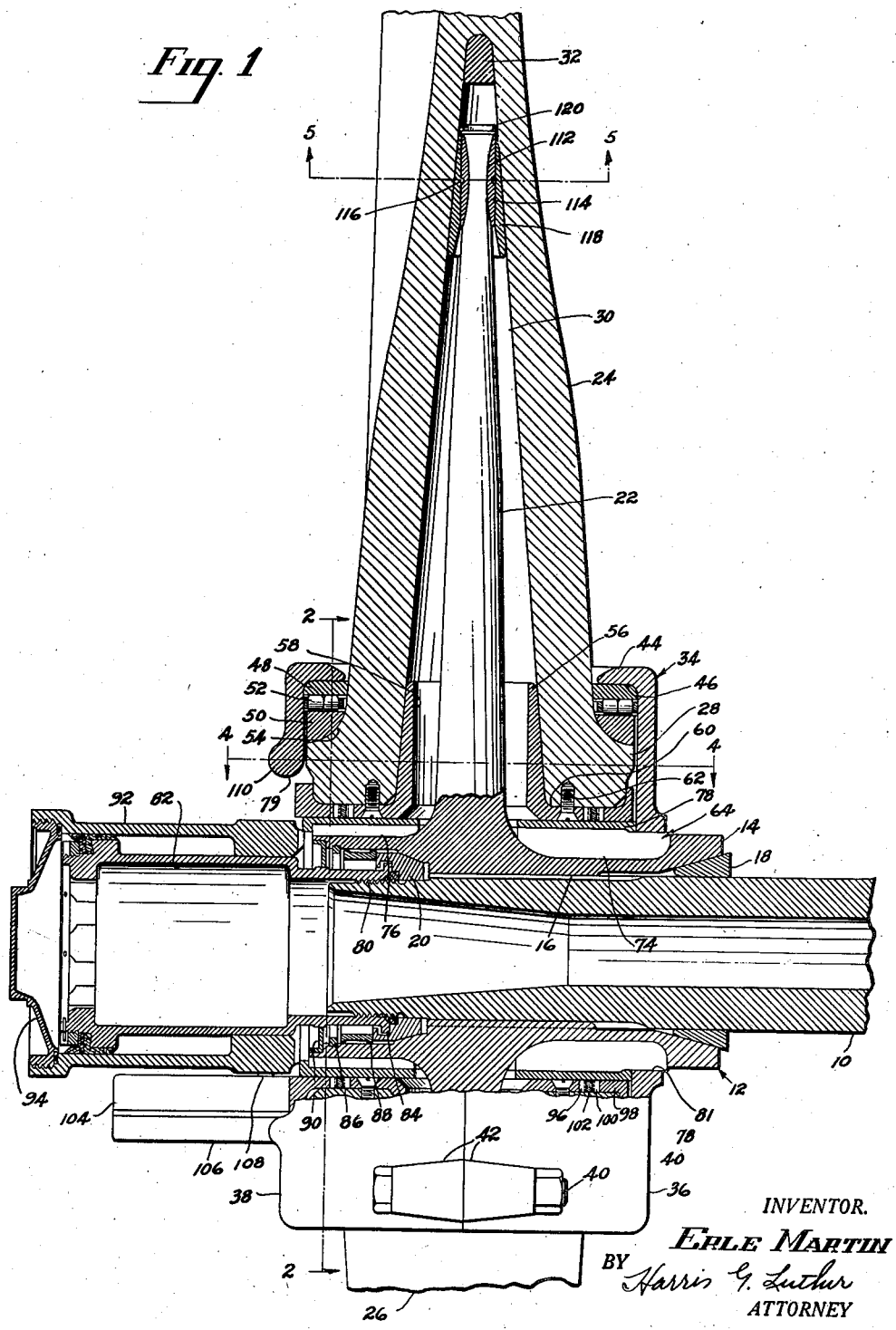

Referring to the drawings in detail, the numeral 10 designates the outwardly projecting end of the drive shaft of an engine such as a radial internal combustion engine, ordinarily employed for the propulsion of airplanes. The shaft 10 may, however, be the drive shaft of any other suitable form of power plant.

The shaft 10 is surrounded by a concentric spider member generally indicated at 12 having a cylindrical portion 14 secured upon the shaft 10 against relative rotation with respect thereto by means of interengaging splines 16 provided upon the exterior of the end portion of the shaft and the interior of the cylindrical portion of the spider member. The spider member is maintained against axial movement with respect to the shaft by means of a pair of frusto-conical annular wedge members 18 and 20 disposed one at each end of the cylindrical portion of the spider and interposed between the flared inner surface of the spider member and the adjacent surface of the shaft at each end of the splines 16. The above described construction provides a solid mounting for the spider upon the end of the shaft and effectively prevents any relative movement between the spider and the shaft.

Besides the cylindrical portion 14, the spider member 12 comprises a plurality of angularly spaced radially extending arms one of which is indicated at 22. The spider member is made of a strong resilient material such as tempered steel and the arms 22 are preferably of an elongated shape such that the length thereof is considerably more than the maximum diameter, in the form illustrated, the length of the arm being approximately 12 times the mean diameter of the arm so that the outer or free end of the arm may have a considerable freedom of movement due to the proportions of the arm and the resiliency of the material of which the spider member is constructed. The arm is preferably tapered along a curve so that the stresses set up in the arm upon movement of the free end thereof will be uniform throughout the length of the arm and there will be no location at which these stresses become sufficiently excessive as to cause fatigue or fracture of the material of the arm. The arm is also preferably provided as a smooth polished member of circular cross section having in its surface no irregularities such as shoulders, apertures, grooves, or scratches that might provide an initial point for a fracture to develop. While but one arm is shown in detail in the accompanying drawings, it is understood that there is one arm for each blade of the propeller, all of the arms being made integral with the cylindrical portion of the spider member.

The propeller blades as indicated at 24 and 26 are preferably constructed of forged metal and are provided with hollow base portions each terminating in a radially extending annular flange as indicated at 28. The cavity 30 in each propeller base is somewhat longer than the length of the corresponding spider arm 22 and is tapered inwardly from the base end of the propeller toward the outer end of the cavity. The cavity is terminated by a plug 32 of heavy metal such as lead by means of which minute differences in the balance of the individual blades may be compensated to provide a statically balanced finished propeller.

The blades are mounted upon the propeller hub so that respective spider arms 22 extend within the cavities 30 of the respective blades and are secured upon the hub against the action of centrifugal force by a split barrel member generally indicated at 34, the blades and barrel comprising together a rotatable unit radially movable with respect to the spider.

The barrel member comprises similar front and rear halves 36 and 38 respectively, secured together by clamp bolts 40 extending through aligned apertured lugs 42 integrally formed upon the exteriors of the barrel halves. The barrel member is provided at each end thereof with an inturned flange, as indicated at 44, surrounding the base portion of the respective propeller blade and between this inturned flange 44 and the radially extending flange 28 of the propeller blade there is provided an antifriction thrust bearing generally indicated at 46 comprising an outer race member 48, an inner race member 50, and a series of antifriction elements such as balls or rollers 52 interposed between the inner and outer race members. The flange 28 of the propeller blade merges into the stem portion of the blade by means of a continuous fillet 54 of relatively large radius and the inner race member 50 is provided with a curved surface which seats throughout its entire area upon the fillet portion of the propeller blade, the race members 48 and 50 being formed as continuous rings inserted upon the propeller blade before the flange 28 is formed by an upsetting operation so that the stresses transferred from the base end of the blade to the barrel through the thrust bearing 46 are uniformly distributed over the entire annular area of the fillet portion 24 and there are no localized stresses which might tend to set up excessive strains in any portion of the base end of the blade.

A sleeve member, generally indicated at 56, having a tapered sleeve portion 58 and a radially extending annular flange portion 60, has its sleeve portion inserted in the base end of the cavity 30 and its flanged portion overlying the base end of the propeller blade. This sleeve member is secured in the base end of the cavity of the propeller blade by means of a shrunk fit, and, if desired, the sleeve member may be additionally secured in place by means of screws 62 extending through the flange portion 60 and into the end of the propeller blade.

In order to provide a limited freedom of relative movement between the propeller blades and the spider so that if the propeller should be slightly out of balance, the center of mass of the rotating unit comprising the blades and hub barrel may be brought into coincidence with the axis of rotation of the spider, a rubber pad, generally indicated at 64 in Fig. 1 and particularly illustrated in Fig. 3, is interposed between the base end of each propeller blade and the adjacent portion of the spider member.

The complete rubber assembly for a two blade propeller comprises a hollow, generally cylindrical, member having a cylindrical extension upon one side thereof. For purposes of manufacture and assembly the rubber member is divided along a plane including the axes of both cylinders to provide two similar halves one of which is particularly illustrated in Fig. 3. As the two halves are exactly similar in all respects except that one may be considered as right hand and the other as left hand, it is believed that a detailed description of only one is sufficient for the purpose of this disclosure.

The half of the rubber cushion assembly illustrated and generally indicated at 64, comprises a semicylinder having flat end walls as indicated at 66, each having in the midportion of its straight side a semi-circular cut out 68. The end walls 66 are so disposed with relation to each other that when the two halves of the rubber pad are assembled upon the propeller, as shown in Fig. 1, the end walls underlie the inner ends of the respective propeller blades with the cut outs 68 forming circular apertures through which the spider arms 22 project while the complementary end walls provide circular resilient bearing surfaces for the inner ends of the propeller blades. Between the end walls each half cylinder is hollowed out as indicated at 70 to provide within the rubber member, when the two halves are assembled together, a cylindrical space to receive the cylindrical portion 14 of the spider 12. The axis of the cylindrical space is disposed at right angles to the axis of the rubber cylinder constituted by the two complementary halves and this rubber cylinder is so dimensioned as to fit within the hub barrel 34 which construction fulfills the condition that the rubber occupies all of the space within the cylindrical hub barrel between the inner ends of the propeller blades and between the interior of the hub barrel and the spider 12. A hollow semi-cylindrical extension or flange 72 is integrally formed upon each side of the semi-cylindrical cushion member co-axial with the semi-cylindrical concavity 70. When the two halves of the rubber cushion assembly are incorporated in the propeller structure, these semi-cylindrical extensions 70 form cylindrical cushion rings disposed between the opposite ends of the cylindrical portion of the spider and the edge of the aperture 81 in the rear half of the hub barrel through which the spider extends, and also between the flange 60 and the front end of the cylindrical portion of the spider.

The resilient cushioning effect of the rubber pads between the inner ends of the blades and the spider, coupled with the resiliency of the spider arms gives to the rotatable mass of the propeller a resiliently resisted, limited freedom of movement lineally along and rotationally about each of the three dimensional axes of the space occupied by the propeller. That is, the major portion of the rotatable mass of the propeller has a limited resiliently resisted universal freedom of movement for both lineal and rotational displacement with respect to the shaft upon which it is mounted, or, conversely, if the propeller, by reason of its gyroscopic effects be considered as rotating in a fixed plane, the shaft may be considered as having the same freedom of movement with respect to the major portion of the rotatable mass of the propeller. This cushioned or resilient mounting tends to damp or absorb any vibrational effects existing between the propeller and the drive shaft upon which it is mounted, and, in furtherance of this end, the physical properties of the rubber cushions are so adjusted that the natural period of the propeller mass in all directions transversely of the shaft is below the rotational speed of the shaft at operative speeds, and the flexibility of the spider arms is adjusted to bring the natural period of the rotatable mass below the frequency of important vibrational effects acting in other directions.

Preferably, the cylindrical portion 14 of the spider member is provided with indentations 74 and 76 upon each side of the arm 22 to receive and confine the material of the interposed portion of the cushion member interposed between the spider and the inner end of the propeller blade.

In the form of the invention illustrated, the indentation 74 at the rear of the arms 22 is materially deeper than the indentation 76 at the front side of the arms to provide a somewhat deeper receptacle for the cushion ring 72. A bearing or shim washer 78 of hardened material is interposed between the bearing surface 66 of each of the pads 64 and the adjacent surface of the flanged portion 60 of the sleeve member 56 attached to the respective propeller blades 24.

The propeller blades are freely movable in a radially outward direction with respect to the spider except for the action of the barrel 34 connecting the inner ends of the several blades together. The forward half 38 of the barrel 34 is provided with an aperture 79 through which the forward portion of the spider 12 extends, the aperture having a diameter larger than the corresponding diameter of the forwardly projecting portion of the spider to provide an annular clearance between the barrel half and the spider. The rear half 36 of the barrel is provided with an aperture 81 through which the rear portion of the spider extends and the edge of this aperture bears upon the rearward extensions 72 of the pads 64. This construction provides a limited freedom of movement in radial directions between the barrel and the spider and as the barrel and blades are secured together to provide a unitary rotatable propeller construction, the entire rotatable propeller mass with the exception of the spider has a limited freedom of movement in radial directions resisted by the resiliency of the pads 64 by means of which the radially movable portion of the propeller may center itself about the axis of the drive shaft 10. The radially outward movement of any propeller blade is resisted by the resulting compression of the resilient pad or pads interposed between the opposite blade or blades and the spider, the compression forces being transmitted to such oppositely disposed pad or pads through the anti-friction thrust bearings 46 and the hub barrel 34.

Adjacent to its outer end the shaft 10 is provided with external screw threads 80 upon which is threaded the inner end of the piston element 82 of a hydraulic mechanism for controlling the pitch angle of the propeller blades, the inner end of this piston element bears against the tapered annular wedge 20 to force the annular member into wedging relation between the front end of the spider member 12 and the shaft 10. The inner end of the piston is provided with a radially extending flange 84 and the forward end of the cylindrical portion of the spider member is provided interiorly thereof with a snap ring 86, an annular ring member 88 being loosely interposed between the flange 84 and the snap ring 86, the purpose of this construction being to provide a device whereby the spider 12 may be withdrawn from the shaft 10 by unscrewing the piston member 82 from the end of the shaft. If desired, a removable seal or guide member 90 may be inserted in the extreme forward end of the cylindrical portion of the spider surrounding the corresponding portion of the piston member 82.

The piston member 82 is surrounded by a reciprocable hydraulic cylinder 92 which is adapted to be moved axially relative to the piston member 82 upon the introduction of fluid under pressure through the hollow drive shaft 10 at the space between the piston 82 and the outer end 94 of the cylinder.

The flanged portion 60 of each of the sleeve members 56 has a diameter somewhat less than the maximum diameter of the base end of the propeller blade and is provided around its periphery with serrations which preferably take the form of a series of gear teeth 96. A counterweight bracket having a ring portion 98 surrounds the base end of each propeller blade and extends into the space between the adjacent surfaces of the propeller blade end and the bearing ring 78 concentric with the flange 60 of the sleeve member 56. The interior circumference of each ring portion 98 is also provided with a series of gear or clutch teeth 100 and a ring member 102 having gear or clutch teeth upon each edge thereof is inserted in locking relation between the flange 60 and the ring 98, the clutch teeth being so arranged and proportioned that a micrometric angular adjustment of the ring with respect to the flange may be obtained.

Each of the rings 78 has formed integrally therewith a stem portion 104 particularly illustrated in Fig. 4, which carries a counterweight member 106, the action of the counterweight members being to turn the propeller blades to which they are attached toward high pitch position under the influence of centrifugal force. Each of the counterweights 106 is connected to the cylinder 92 by means of a suitable bearing 108 so that the action of the counterweights may be regulated by the application of hydraulic fluid under pressure to the cylinder 92 to control the pitch angle of the propeller blades according to some predetermined condition such as the rotating speed of the engine driving the power shaft 10. The forward portion of the barrel 34 is cut away to allow the stems 104 of the counterweight brackets to project therethrough and this cut away portion is suitably reinforced by means of a bead 110.

Adjacent to its outer end, each of the arms 22 is provided with a curved reduced portion 112 upon which is mounted a split bearing member 114 formed of similar halves of some suitable bearing material such as cast iron or bronze. Preferably the two halves of this bearing are provided with aligned semi-annular grooves 116 within which a wire may be positioned to secure the split bearing upon the reduced portion of the arm. The split slidable bearing 114 has bearing relation with the interior surface of an outer tubular bearing member 118 positioned in the cavity 30 of the propeller blade adjacent to the outer end of the cavity to provide suitable bearing surfaces for slight movements in an axial direction of the arm relative to the propeller blade incident to the resilient action of the pad 64. Preferably the tubular bearing member 88 has at its outer end a beaded-over portion 120 overlying the outer edge of the end of the arm 22 to render it impossible for the bearing member 118 to slip down the arm toward the hub and thus lose its bearing contact with the bearing element 114.

As stated above, the arms are somewhat resilient and elongated in form and engage the respective blades at a considerable distance from the central portion of the hub. While the centrifugal forces acting on the blades will tend to keep them in a straight radial position with respect to the hub whenever the propeller is rotating at a speed sufficient to render such centrifugal forces effective, it is highly desirable that all forces tending to move said blades out of such straight radial position be reduced to a minimum in so far as is practically possible and for this purpose the spider arms 22 are desirably made of such a length as to bring the outer bearing members 114 and 118 to such a location that they are substantially centered on the center of percussion of the blade with which they engage. With such a construction, force impulses transmitted to the blades by the spider arms will cause the blades to revolve evenly about the axis of the hub and eliminate any tendency of the driving force to overcome the action of centrifugal force and cause the blades to tilt in the hub mountings. The exact location of the center of percussion of the blades depends upon many variable factors for each propeller blade and blade mounting. A general statement of the location of the center of percussion may be made as follows:

$$L = \frac{I}{mx_0}$$

Where L is the distance from the axis of suspension to center of percussion,

I is the moment of inertia of the body about the axis of suspension, m is the total mass of the body, and $x_0$ is the distance from the axis of suspension to the center of gravity of the blade.

Computation of this expression for certain types of blades has located the center of percussion somewhat beyond the mid-length of the blade in an outward direction. For such a blade the spider arm would have to be longer than half the blade length, but for other blades, for instance a blade having a heavy root portion in proportion to its intermediate and tip portion, the center of percussion might be well inward from the location above described.

From the above description it will be observed that there has been provided between each propeller blade and the propeller hub, a resilient connection comprising the flexible arm 22 by means of which power is transmitted from the drive shaft to the propeller blade and the resilient cushion 64 interposed between the inner end of the blade and the solid members of the propeller hub, this construction permits slight resilient movements of the propeller blades in both radial and angular directions.

The effect of rendering the propeller blades resilient with respect to the propeller hub is partly to insulate the blades from the engine vibrations, but, more importantly, is to provide a system comprising the propeller and the engine crankshaft the natural period of vibration of which can be controlled by altering the stiffness of the arms and the resilient cushions and can be given a value so low that the system will not be in resonance with the engine vibrations at any engine speed at which the engine power and consequent vibrational force is sufficient to cause any objectionable vibration in the propeller.

While there has been illustrated and described a particular mechanical embodiment of the idea of the invention, it is to be understood that the invention is not limited to the particular mechanical embodiment so illustrated and described, but that such changes in the size, shape, and arrangement of parts may be resorted to as come within the scope of the appended claims.

As the invention has now been described so that others skilled in the art may clearly understand the same, what it is desired to secure by Letters Patent is as follows.

What is claimed is:

1. In an aeronautical propeller having a hub and a plurality of blades carried by said hub for pitch changing movements, a hub member for constraining said blade to revolve about a common axis, and a second hub member including integral resilient arms of substantially circular cross section constituting respective vibration absorbing driving means for each of said blades.

2. In combination with an engine power shaft subject to torsional vibrations and a propeller having a spider fixed on said power shaft, and a plurality of propeller blades and a blade retaining hub barrel together constituting a rotatable element driven by said spider, means for fixing the period of natural frequency of said propeller and power shaft as a unit at a value out of resonance with the frequency of said torsional vibrations during operation of said engine under power, said means comprising resilient arms constituting the sole respective driving connections between said spider and each of said propeller blades, said resilient arms being flexible in all directions about their axis.

3. In an aeronautical propeller, a rotatable unit comprising blade and hub elements driven by a rotatable shaft, and a resilient cushion between said rotatable element and said shaft of such nature that said rotatable element may bring its center of gravity into coincidence with the center of rotation when operating above critical speed, said cushion having a spring rate such that the natural period of vibration of the rotatable mass is below the operative rotational speed of said shaft.

4. In an aeronautical propeller having a plurality of blades, a spider having a plurality of elongated resilient arms, one for each blade, operatively associated with said blades to provide flexible driving connections between said spider and said blades, said driving connections being substantially at the center of percussion of said blades, and each of said arms being flexible in all directions perpendicular to its respective longitudinal axes.

5. In an aeronautical propeller having a plurality of propeller blades, a spider adapted to be rigidly mounted on a rotatable drive shaft and having a plurality of flexible arms providing resilient driving connections between said blades and said drive shaft, a barrel surrounding said spider and the base ends of said blades for retaining said blades on said spider, and a plurality of resilient mounting pads in said barrel positioned one between the inner end of each of said blades and said spider, whereby said barrel retains said blades in position against the action of centrifugal force, but all driving power transmitted to said blades is transmitted through said flexible spider arms.

6. In an aeronautical propeller, a plurality of propeller blades each having an elongated cavity in the base portion thereof, a spider having a cylindrical portion adapted to be rigidly mounted on a rotatable drive shaft and a plurality of elongated resilient arms, one for each of said blades, received in the cavities of the respective blades, said arms having a cross-sectional diameter less than the corresponding cross-sectional diameter of the receiving cavity, a resilient mounting connection between said blades and said spider, and a slidable bearing between the outer end of each of said arms and the wall of the cavity of the respective propeller blade.

7. In an aeronautical propeller, a spider, a propeller blade having a hollow base portion mounted on said spider for limited movement with respect thereto, an arm having a spring rate frequency lower than the normal power impulse frequency of the propeller driving engine integral with said spider and projecting radially therefrom into the hollow base portion of said blades, a slidable bearing between the outer end of each arm and the interior of the respective blade, and flexible connections between the inner ends of said blades.

8. In an aeronautical propeller, a blade carrying spider adapted to be rigidly mounted on a rotatable power shaft, a propeller blade having a hollow base portion mounted on said spider for limited movement with respect thereto, an elongated arm integral with said spider projecting radially therefrom into the hollow base portion of said blade for transmitting power from said spider to said blade, means for retaining said blade on said spider against the action of centrifugal force and means for backing up the end of said blade, said last named means comprising, a bearing member of resilient material mounted on said spider surrounding said arm and shaped to conform to the curvature of said spider and the curvature of said blade end and to provide a flat bearing surface opposite the end of said blade.

9. In an aeronautical propeller, a blade carrying spider, propeller blades having hollow base portions mounted on said spider for limited movement with respect thereto, a tapered arm integral with said spider projecting radially therefrom into the hollow base portion of each blade, and a bearing between the outer end of each arm and the interior of the respective blade, the length of said arms being such as to provide substantial coincidence between the centers of said bearings and the center of percussion of said blades.

10. In an aeronautical propeller, a blade carrying spider adapted to be rigidly mounted on a rotatable power shaft, a propeller blade having a hollow base portion mounted on said spider for limited movement with respect thereto, an arm integral with said spider projecting radially therefrom into the hollow base portion of said blade for transmitting power from said power shaft to said blade, means for retaining said blade on said spider against the action of centrifugal force and means for backing up the end of said blade, said last named means comprising a rubber member mounted on said spider and shaped to conform to the curvature of said spider and the curvature of said blade end and provide a flat bearing surface opposite the end of said blade.

11. In an aeronautical propeller, a blade carrying spider adapted to be rigidly mounted on a rotatable power shaft, a propeller blade having a hollow base portion mounted on said spider for limited movement with respect thereto, an arm integral with said spider projecting radially therefrom into the hollow base portion of said blade for transmitting power from said power shaft to said blade, means for retaining said blade on said spider against the action of centrifugal force and means for backing up the end of said blade, said last named means comprising a bearing member of resilient material fitted in a depression on said spider surrounding said arm and shaped to conform to the curvature of said spider and the curvature of said blade end and provide a flat bearing surface opposite the end of said blade.

12. In an engine propeller combination in which the engine delivers power to the propeller in a series of successive torsional impulses, means for damping the vibratory effect of said torsional impulses on said engine and said propeller comprising resilient driving connections between the hub and blades of said propeller, said resilient connections having a spring rate frequency in rotational and axial directions lower than the frequency of the torsional impulses of said engine at any engine speed consistent with power operation of said engine.

13. In a propeller adapted to be driven by an engine which delivers driving power to the propeller in a series of successive torsional impulses, means for damping the vibratory effect of said impulses on said engine and said propeller comprising, flexible connections securing the blades of said propeller to the hub portion thereof against the action of centrifugal force, and resilient driving connections between said hub portion and said blades, said driving connections comprising elongated tapered substantially cylindrical arms having a spring rate frequency below the frequency of the torsional impulses of said engine at engine speeds consistent with power operation.

14. In a propeller adapted to be driven by an engine which delivers driving power to the propeller in a series of successive torsional impulses, means for damping the vibratory effect of said impulses on said engine and said propeller comprising, flexible connections securing the blades of said propeller to the hub portion thereof against the action of centrifugal force, and resilient driving connections between said hub portion and said blades, said driving connections comprising elongated arms having a spring rate frequency below the frequency of the torsional impulses of said engine at engine speeds consistent with power operation, said arms being in contact with said blades only at their outer ends and having a length such that the power impulses of said engine are delivered to said blades at points at or adjacent to the centers of percussion of the respective blades.

15. A propeller comprising a hub, a plurality of resilient radially extending arms on said hub, a plurality of blades each having a hollow base portion receiving a respective one of said arms and a circular flange portion, a hub barrel engaging said flange portions to detachably secure said blades to said hub for pitch changing rotation about their longitudinal axes, a flexible connection between each of said blades and said hub to provide for limited freedom of movement of said blades in all directions, and slidable and rotatable bearings between the outer ends of said arms and the interiors of the respective blades, said bearings being located outwardly a distance from said hub such that the major bending moments along the axes of said blades are taken by said resilient arms and not by said blades.

16. In a propeller adapted to be mounted upon an engine crankshaft subject to torsional vibrations having a frequency based on the frequency of the power impulses of the engine and radial vibrations based on the operating speed of the engine, means for damping said vibrations comprising, resilient radial connections between the blades and hub of said propeller having a spring rate frequency below the frequency of the radial vibrations of said crankshaft at engine speeds consistent with power operation, and separate resilient driving connections between said hub and said blades having a spring rate frequency below the frequency of the power impulses of said engine at operating speeds consistent with power operation.

17. An aeronautical propeller having a hub portion and a plurality of detachable blades, resilient blade retaining connections between said blades and said hub portion, and independent resilient power transmitting connections between said blades and said hub portion, said blade retaining connections having a spring rate frequency different from the spring rate frequency of said power transmitting connections.

18. In an aeronautical propeller having a plurality of blades, a spider having a plurality of elongated resilient arms, one for each blade, operatively associated with said blades to provide flexible driving connections between said spider and said blades, and means supporting each blade for rotational movements about its respective spider arm, each arm having a curved taper from its inner to its outer end to provide a predetermined spring rate frequency for said arms.

19. An aeronautical propeller having a plurality of blades mounted for movement as a unit in all directions and comprising a spider having a plurality of elongated arms, one for each blade, each arm resilient in at least two directions normal to each other and normal to said arm, operatively associated with said blades to provide a support for said blades flexible in all directions.

20. An aeronautical propeller having a plurality of blades mounted for movement as a unit in all directions, and comprising a spider having elongated arms one for each blade, each arm resilient in at least two directions normal to each other and normal to said arm, operatively associated with said blades to provide a support for said blades flexible in all directions, and a resilient cushion between said spider and said unit blade mounting.

21. An aeronautical propeller having a plurality of blades mounted for movement as a unit in all directions and comprising a spider having a plurality of elongated arms, one for each blade, each arm resilient in at least two directions normal to each other and normal to said arm, operatively associated with said blades to provide a support for said blades flexible in all directions, and means for rotating said blades about the respective arms to control the pitch of said propeller while in flight.

ERLE MARTIN.